Oct. 10, 1950     E. H. WILLETTS     2,525,388
VEHICLE ALIGNING MECHANISM
Filed Feb. 7, 1947     2 Sheets-Sheet 1
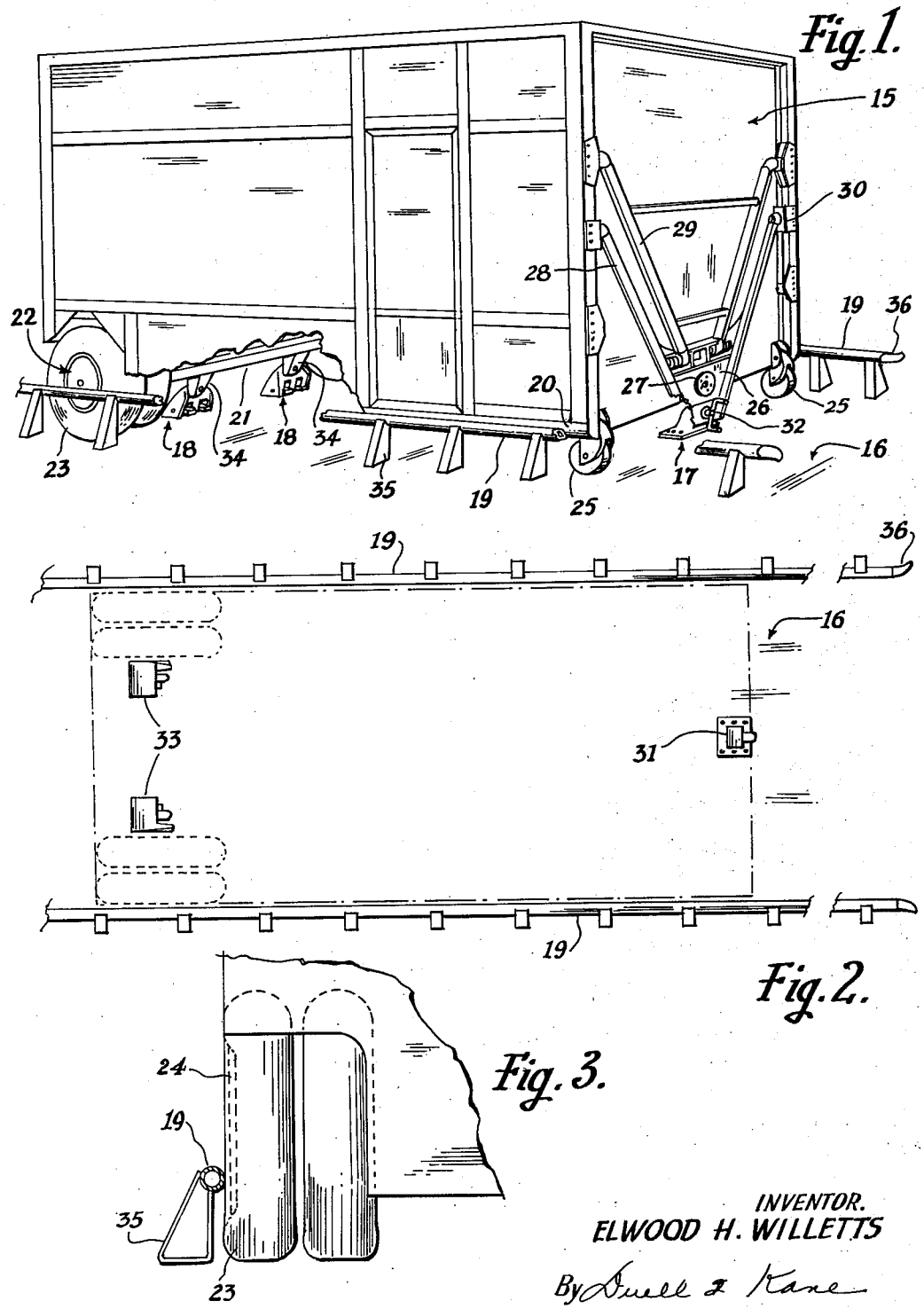
INVENTOR.
ELWOOD H. WILLETTS
By Duell & Kane
ATTORNEYS.

Oct. 10, 1950 — E. H. WILLETTS — 2,525,388
VEHICLE ALIGNING MECHANISM
Filed Feb. 7, 1947 — 2 Sheets-Sheet 2
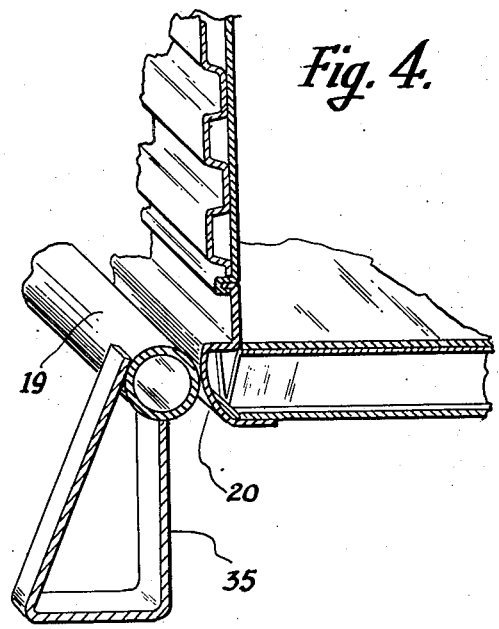
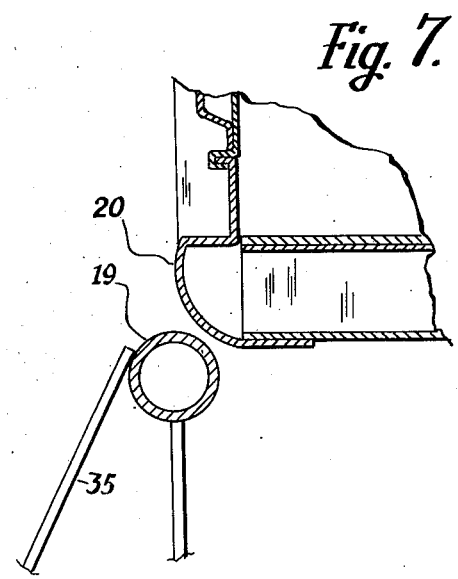
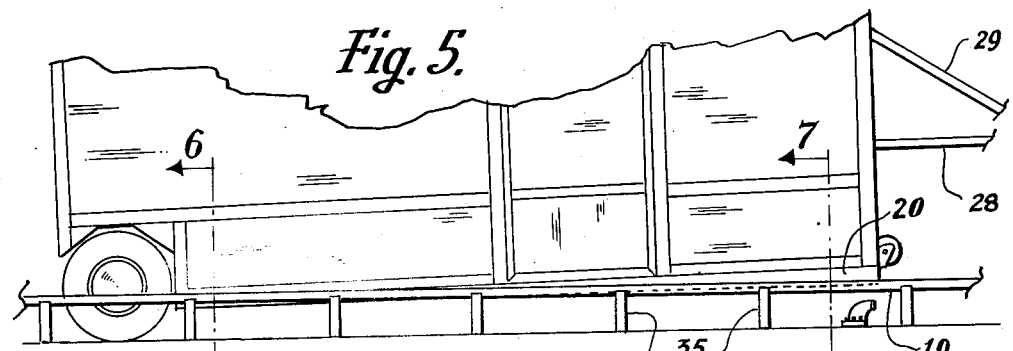
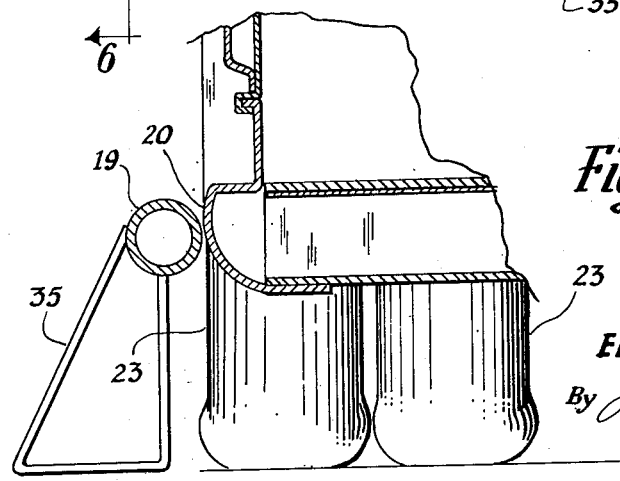
INVENTOR.
ELWOOD H. WILLETTS
By Duell & Kane
ATTORNEYS.

Patented Oct. 10, 1950

2,525,388

UNITED STATES PATENT OFFICE 2,525,388

VEHICLE ALIGNING MECHANISM

Elwood H. Willetts, Douglaston, N. Y.

Application February 7, 1947, Serial No. 727,011

2 Claims. (Cl. 105—368)

This invention relates to improved vehicle positioning mechanism for use in transversely positioning and aligning vehicles such as trailers on the deck or floor of a ramp, railway car, ship or aircraft.

Vehicles, particularly semi-trailers, of the type used in highway freight transport are sometimes carried on the deck of railway cars in what is termed trailer flatcar service. It will be appreciated that it is necessary for the trailer to be transversely positioned and firmly secured to the deck of the car so as to avoid movement of the vehicle which would interfere with railroad line clearances and so as to secure the vehicle against longitudinal movements resulting from buffing shocks. I have found that a vehicle can be accurately positioned and firmly secured to the deck in a satisfactory manner by providing a releasable rigid connection between the vehicle body and the deck as, for instance, in the manner shown in my copending application Serial No. 677,071 filed on June 15, 1946, for Clamping Means, now Patent Number 2,503,368, April 11, 1950.

In such an arrangement inter-engaging clamping or connecting means are provided on the vehicle body and on the deck respectively. A problem arises in transverse positioning or both ends of the vehicle on the deck surface so that the clamping or connecting means on the vehicle body are brought into proper registry with the clamping means on the deck. The vehicle is rolled onto the deck surface and in the case of a trailer is generally backed on in a reverse direction by a steerable power tractor to its proper position and it will be appreciated that difficulty would ordinarily be encountered in accurate transverse positioning and aligning the vehicle in a manner to obtain the necessary registration between the clamping or connecting means.

It is an object of the present invention to provide improved vehicle aligning mechanism which will properly position and align the vehicle on the deck surface as the vehicle is moved into clamping position so that the inter-engaging clamping or connecting means on the deck and vehicle, respectively, are thus brought into proper registry.

A further object is the provision of vehicle aligning mechanism of the above type which requires no manipulation or conscious operation on the part of the vehicle driver but which automatically results in transverse positioning of the vehicle and in bringing the parts into proper alignment.

Another object is the provision of mechanism of this type having a minimum number of parts which are of rugged construction and are permanently secured in position so as to minimize the danger of wear or damage. In my improved device, all the loads and forces are distributed over relatively large wear surfaces, thereby further prolong the life of the mechanism and minimizing damage and wear in localized areas.

In the accompanying drawing:

Fig. 1 is a perspective view of a trailer secured to a deck and showing my improved vehicle positioning and aligning mechanism;

Fig. 2 is a plan view of a deck surface showing the arrangement of the portions of my vehicle positioning and aligning mechanism and also illustrating in dotted lines the relative position of the vehicle;

Fig. 3 is a detailed view showing one of the vehicle positioning members in engagement with one of the rear vehicle wheels;

Fig. 4 is a sectional perspective view illustrating the inter-engagement between the vehicle positioning members when the vehicle is in proper position clamped to the deck surface;

Fig. 5 is a side elevational view partially broken away of the vehicle in position on the deck surface but with the forward portion thereof elevated as when in engagement with the fifth wheel of a tractor;

Fig. 6 is a sectional detailed view on the line 6—6 of Fig. 5; and

Fig. 7 is a sectional detailed view on the line 7—7 of Fig. 5 with the rear wheels omitted for the sake of clarity, showing the forward portion of the vehicle in elevated position and out of proper alignment.

My invention is applicable to vehicles and deck surfaces of various types and is used for properly positioning or aligning the vehicle on a deck surface so that inter-engaging clamping members on the vehicle and deck are brought into proper registry.

In the accompanying drawings the invention is illustrated as applied to a semi-trailer 15 which is secured to the deck 16 of a railroad flat car by means of a releasable clamping device 17 at the central part of the front of the trailer and clamping device 18 located adjacent the two sides of the trailer at the rear thereof. The construction of the clamping members is the same as that shown in my copending patent application Serial No. 677,071 filed June 15, 1946.

My vehicle aligning and centering mechanism consists generally of a pair of elongated guide members in the form of guide rails 19 mounted upon the deck in spaced parallel relationship and adapted to cooperate with the tires of the rear wheels and also with elongated guide members 20 having cam surfaces and extending along the lower edge of the vehicle body at opposite sides thereof.

Before describing the invention in further detail I will briefly describe the associated portions of the vehicle, deck and clamping devices. For purposes of illustration I have shown a vehicle 15 of the semi-trailer type which consists of an integrally framed body supported near the rear thereof by means of a transverse axle 21 and wheels 22 at opposite sides thereof. The wheels are provided with pneumatic tires 23 supported in the usual manner on suitable steel rims 24 and in this connection the pneumatic tires project laterally beyond the steel rims a slight distance as shown in Fig. 3.

At its forward end the trailer may be provided with suitable retractable wheels 25 and also with a coupling member 26 provided with a kingpin 27 which is engageable with a fifth wheel mounted on the power tractor or truck used for towing the trailer on the highway, and for backing it into position on deck, and for pulling it off the deck in the opposite direction from which it is backed on.

The coupling member 26 is constructed in a manner more fully disclosed and described in my co-pending patent application Serial No. 677,071 so that it may shift from horizontal operable position at which point it is engageable with the fifth wheel to vertical folded position as shown in Fig. 1. For this purpose the coupling member 26 is mounted on the trailer by means of two pairs of diverging arms or brackets 28 and 29, the brackets 28 being fixedly attached to the coupling member at one end and being provided with a sliding pivotal mounting 30 connecting them to the front of the trailer at the opposite end. The arms 29 are pivotally attached at opposite ends to the coupling member and to the front of the trailer respectively. This arrangement permits the coupling member to shift between horizontal and vertical positions.

The clamping devices 17 and 18 are arranged so as to provide a rigid releasable connection between the vehicle, particularly the body thereof, and the deck. Other types of clamping devices may be used and these are shown merely for the purposes of illustration. The clamping devices are disposed in a generally triangular relationship with the device 17 adjacent the center of the front of the vehicle and the devices 18 adjacent the two sides of the rear of the vehicle. Clamping device 17 consists of a fixed bracket 31 attached to the deck and having an internally threaded aperture formed in a projecting stud on the forward face thereof which is engaged by the screw 32 on coupling member 26. The clamping devices 18 consist of the brackets 33 which are hingedly attached to the deck and are formed with projecting tapered studs which engage with brackets 34 attached to the axle 21.

The semi-trailer 15 is backed into position on the deck surface so that the brackets 34 interengage with the brackets 33 and so that the clamping screw 32 can be inter-engaged with the bracket 31. It will be appreciated that the trailer has to be transversely centered and positioned on the deck surface so that the clamping devices are brought into proper registry. My improved aligning and positioning members 19 and 20 are arranged to bring about this result without any conscious or manual adjustment. In the illustrated device, at the rear of the trailer body, wells or recesses of the usual type are provided to accommodate the wheels 22. Along the lower edges of the body extending from the wheel wells to the front end thereof, I provide the guide or cam members 20 which are of sturdy metallic construction and are firmly secured in position either by being formed integrally with the body structure or by being welded or otherwise attached in position. Each of the guide members presents a vertically convex outer surface as most clearly shown in Figs. 4, 6 and 7. Thus the guide member 20 has a cam surface which serves to guide and center the vehicle when it engages the guide member 19. The wheels 22 are arranged so that the side-walls of the tires are flush with the outer lateral surface of the guide members 20 as most clearly appears from Fig. 6.

The guide members or rails 19 are in the form of rods or tubes mounted on suitable brackets 35 on the deck. The rails 19 are in parallel relationship and are mounted at substantially the same height as the guide members 20 when the trailer is clamped in position on the deck as shown in Fig. 1. They are also in such spaced relationship as to provide for substantially no clearance between the rails 19 and the guide members 20 as shown in Fig. 4 when the trailer is properly positioned and clamped in place. The guide rails 19 may extend for substantially the entire length of the deck surface and they preferably flare outwardly at one or both ends as shown at 36 in Figs. 1 and 2 so as to facilitate the movement of the vehicle into the space between the bars.

The operation of my improved guiding and centering mechanism is as follows: The vehicle is backed into position between the guide rails 19. This is facilitated by the fact that the rails flare outwardly at 36 so that when the rear tires, at the then leading end of the vehicle, engage the flared portion 36 the vehicle is "funneled" and guided into the space between the bars. As the vehicle is moved rearwardly the guide rails will engage the sides of tires 23 and guide and initiate alignment during the longitudinal movement of the vehicle. In this connection the steel rims 24 of the tires prevent undue tire deflection from guide rail pressure, and limit the permissible transverse misalignment while also preventing damage to the tires. The initial engagement between the guide rails and the side of the tire is a resilient yielding engagement which results in the gradual centering of the vehicle between the guide rails. Should the amount of misalignment be excessive the guide rail will engage against the rigid rim of the tire preventing further deflection of the tire and causing the more rapid correction of the misalignment. The guide rail engages the tire at a point above the position where the tire cross section varies with the load. In this manner, the aligning and centering action is not affected by the amount of tire inflation or by the load carried by the trailer.

When the vehicle has been backed to the proper longitudinal position the rear of the vehicle will be properly centered and the brackets 34 will engage the brackets 33 at the rear of the vehicle. At this point the forward end of the vehicle will be slightly elevated as shown in Fig. 5 because the kingpin is still in engagement with the fifth wheel of the tractor. After the support wheels 25 at the forward end of the trailer are lowered, the tractor may be disengaged from the trailer, lowering the trailer forward of its axle, until it rests on the support wheels. During this downward vertical movement resulting from detachment of the tractor, misalignment forward of trailer tires is corrected, first at its point of least movement, which is at the rear of vehicle cam member 20 and thence moving forwardly to the front of the trailer. The correction of the misalignment results from the cam action contact between cam member 20 and guide rail 19.

Referring now to Figs. 4-7 inclusive, Fig. 5 illustrates the trailer with the forward end thereof in elevated position. Fig. 6 illustrates the trailer as properly aligned and shows the relative position of the two guide members 19 and 20 at the point 6—6 of Fig. 5 near the rear portion of the trailer when the trailer is thus in elevated position. Fig. 7 illustrates the trailer as misaligned and shows the relationship of the guide members near the forward end of the trailer at the point 7—7 of Fig. 5. It will be appreciated that as the forward end of the vehicle is lowered from the position shown in Fig. 7, the cam surface of guide member 20 will engage with the guide rail 19 starting near the rear of the vehicle and moving forwardly as the front end of the vehicle is lowered into normal position. This camming action serves to align and center the forward portion of the vehicle between the guide bars 19 so that the vehicle is in proper position when it has been lowered thereby enabling the screw 32 to be engaged with the fixed bracket 31. The inter-engagement between the guide members 19 and 20 in this manner results in a gradual correction of the misalignment and in a distribution of the load and forces over a relatively large wear surface.

My improved vehicle aligning and centering mechanism thus accomplishes the desired functions in a relatively simple manner without damage or injury to the vehicle or the vehicle tires. Also, the mechanism is so formed as to have a minimum number of parts each of rugged construction and arranged so that the wear and forces are distributed over a relatively large area. The device also results in self-aligning or centering of the vehicle as it is moved into position and as the forward end is lowered into clamping relationship. Modifications may be made in the illustrated embodiment of my invention without departing from the invention as set forth in the accompanying claims. Thus the cooperating guide members on the vehicle and deck may also be located near the top or upper portion of the vehicle, in which case the guide members 20 on the vehicle extend rearwardly beyond the tires which are located therebelow. This arrangement serves to support the body at the upper end of the side panels, thereby relieving the body structure of transverse stress due to rolling action of the deck during high seas, etc.

I claim:

1. Apparatus for accurately positioning a vehicle on a deck so that cooperating clamping means on the desk surface and on the vehicle may be interengaged comprising a deck surface, a vehicle of the semi-trailer type having a body portion having a floor and rear wheels supporting the same, the forward end of the vehicle being shiftable around the wheels from an elevated towing position to a lowered position of rest, and means for transversely positioning the forward portion of the vehicle on the deck surface as it is lowered from an elevated towing position to a position of rest, said means comprising guide members on the two sides of the floor of the vehicle having outer cam surfaces and guide means mounted on the deck surface in spaced relationship at a height to be engageable by the guide members as the vehicle is lowered to a position of rest, the space between the guide means being approximately the same as the distance between the outer cam surfaces whereby the cam surfaces of the guide members engage the guide means to transversely position the forward end of the vehicle as it is lowered to a position of rest.

2. Apparatus for accurately positioning a vehicle on a deck so that cooperating clamping means on the deck surface and on the vehicle may be interengaged comprising a deck surface, a vehicle of the semi-trailer type having a body portion having a floor and fixed rear wheels provided with pneumatic tires supporting the same, the forward end of the vehicle being shiftable around the wheels from an elevated towing position to a lowered position of rest, a pair of guide rails mounted on the deck surface in spaced parallel relationship at a height to be engageable with the outer surface of the tires above the point where the cross section of the tire varies with the load, the space between the rails being substantially the same as the distance between the outer surface of the tires so as to engage the tires and exert camming pressure on the vehicle to properly align the rear portion thereof as the vehicle is moved longitudinally over the deck surface, and guide members on the two sides of the floor of the vehicle having outer cam surfaces at a height to be engageable with the guide rails as the vehicle is lowered to a position of rest, the distance between the outer cam surfaces being approximately the same as the space between the rails whereby the cam surfaces of the guide members engage the guide rails to transversely position the forward end of the vehicle as it is lowered to a position of rest.

ELWOOD H. WILLETTS.

REFERENCES CITED

The following references are of record in the file of this patent:

UNITED STATES PATENTS

| Number | Name | Date |
| --- | --- | --- |
| 1,581,745 | Kellett | Apr. 20, 1926 |
| 2,065,573 | Frede | Dec. 29, 1936 |
| 2,099,288 | Allen | Nov. 16, 1937 |
| 2,162,192 | Yoder | June 13, 1939 |

FOREIGN PATENTS

| Number | Country | Date |
| --- | --- | --- |
| 458,277 | Great Britain | Dec. 16, 1936 |